United States Patent [19]

Gupta

[11] Patent Number: 4,868,265

[45] Date of Patent: Sep. 19, 1989

[54] POLYANHYDRIDE PROCESS FROM BIS(TRIMETHYLSILYL) ESTER OF DICARBOXYLIC ACID

[75] Inventor: Balaram Gupta, North Plainfield, N.J.

[73] Assignee: Hoechst Celanese Corp., Somerville, N.J.

[21] Appl. No.: 253,298

[22] Filed: Oct. 5, 1988

[51] Int. Cl.$^4$ .............................................. C08G 67/04
[52] U.S. Cl. ........................................ 528/26; 528/12; 528/21; 528/33; 528/206; 528/207; 528/271
[58] Field of Search ...................... 528/26, 271, 12, 21, 528/33, 206, 207

[56] References Cited

PUBLICATIONS

K. W. Leong et al., Macromolecules, 20(4), 705–712, 4.87.
K. W. Leong et al., Biomaterials, 1986, vol. 7, Sep., 364–371.
G. A. Olah et al., J. Org. Chem., 44, 4272–4275 (1979).
F. Herrmann et al., Journal of Chromatography, 370 (1986), 49–61.
H. R. Kricheldorf et al., Polymer Bulletin, 1, 383–388 (1979).

*Primary Examiner*—Harold D. Anderson
*Attorney, Agent, or Firm*—Marvin Turken

[57] ABSTRACT

A process is provided for preparing homopolyanhydrides or regularly alternating copolyanhydrides by condensing a bis(trimethylsilyl) ester of a dicarboxylic acid, e.g., an alkylenedicarboxylic acid such as sebacic acid or a bis(p-carboxyphenoxy)alkane such as 1,3-bis(p-carboxyphenoxy)propane, with a dicarboxylic acid chloride, e.g., an alkylenedicarboxylic acid chloride such as sebacoyl chloride or a phenylenedicarboxylic acid chloride such as terephthaloyl chloride or isophthaloyl chloride, to yield the polyanhydride and chlorotrimethylsilane as a by-product. The process may be carried out in the presence of a condensation catalyst, e.g., a highly ionized organic or inorganic fluoride, such as tetrabutylammonium fluoride.

20 Claims, No Drawings

POLYANHYDRIDE PROCESS FROM BIS(TRIMETHYLSILYL) ESTER OF DICARBOXYLIC ACID

BACKGROUND OF THE INVENTION

1. Field of the Invention

This invention relates to a new process for preparing polyanhydrides.

2. Background Information

Various polyanhydrides are known in the art as described, for example, in the references discussed in the Description of Related Art given hereinafter. Some of these, utilizing their property of hydrolytic degradation, have been used for the controlled release of agents such as drugs, e.g., poly[bis(p-carboxyphenoxy)alkane anyhydrides], copolyanhydrides of bis(p-carboxyphenoxy)alkanes with sebacic acid, poly(terephthalic acid anhydride) and copolyanhydrides of terephthalic and sebacic acids. One method of preparing such polyanhydrides is melt condensation, wherein a prepolymer is first formed by reacting a dicarboxylic acid with acetic anhydride, and the prepolymer is separated from the reaction mixture, washed, and melt condensed at an elevated temperature to form the polyanhydride. A disadvantage of this method is that it requires two steps with a necessary separation and purification of the prepolymer produced by the first step. Moreover, the reversible thermal depolymerization may limit the highest molecular weight obtainable. A still further disadvantage is that in the case of copolyanhydrides, random polymers are produced, which are subject to less controlled rates of hydrolytic degradation, rather than regularly alternating polymers which tend to degrade hydrolytically in a more controlled manner.

Another method of preparing polyanhydrides is by the dehydrochlorination of a free dicarboxylid acid and a diacid chloride (Schotten-Baumann condensation). However, this method always requires at least one solvent (two for interfacial polymerization), and yields corrosive hydrogen chloride gas as a by-product.

A third method of preparing polyanhydrides is dehydrative coupling of the free dicarboxylic acid using a coupling agent such as an organophosphorus compound. However, it is difficult to obtain polymers of relatively high molecular weight using this method.

DESCRIPTION OF RELATED ART

The following prior art references are disclosed in accordance with the terms of 37 CFR 1.56, 1.97 and 1.98.

K. W. Leong et al., "Synthesis of Polyanhydrides: Melt-Polycondensation, Dehydrochlorination and Dehydrative Coupling," published in Macromolecules, 20(4), 705–712, (April 1987), disclose the preparation of a variety of polyanhydrides including homopolyanhydrides of bis(carboxyphenoxy)alkanes, terephthalic acid, sebacic acid and glutaric acid, and copolyanhydrides of bis(carboxyphenoxy)alkanes with sebacic acid, and terephthalic acid with adipic or sebacic acid, using any of the three methods discussed previously.

K. W. Leong et al., "Polyanhydrides for Controlled Release of Bioactive Agents," published in Biomaterials 1986, Vol. 7, September, 364–371, disclose the use of homopolyanhydrides of bis(carboxyphenoxy)alkanes and terephthalic acid, and copolyanhydrides of each of the latter dicarboxylic acids with sebacic acid, as controlled release agents for drugs in the form of polymer matrices containing the drug.

G. A. Olah et al., J. Org. Chem. 44, 4272–4275 (1979) disclose the use of a combination of chlorotrimethylsilane and lithium sulfide for the silylation of alcohols, nitrocyclohexanes, aldehydes and ketones.

F. Herrmann et al., Journal of Chromatography, 370 (1986) 49–61, disclose bis(trimethylsilyl) esters of various aliphatic saturated, aliphatic unsaturated, aromatic, and alicyclic dicarboxylic acids.

H. R. Kricheldorf et al., "Synthesis of Aromatic Polyesters from Silylated Monomers—New Polymer Synthesis II," published in Polymer Bulletin 1, 383–388 (1979), disclose the synthesis of aromatic polyesters from silylated bisphenols and diacid chlorides, or from trimethyl siloxy benzoyl chlorides, by thermal condensation.

Pending application Ser. No. 198,803, filed May 23, 1988, by B. Gupta et al., covers new homopolyanhydrides of carboxyaryloxyalkanoic acids.

SUMMARY OF THE INVENTION

In accordance with this invention, polyanhydrides are prepared by a process comprising condensing a bis(trimethylsilyl) ester of a dicarboxylic acid with a dicarboxylic acid chloride to yield the polyanhydride and chlorotrimethylsilane as a by-product.

DESCRIPTION OF PREFERRED EMBODIMENTS

The condensation reaction of this invention may be carried out as shown in the following equation:

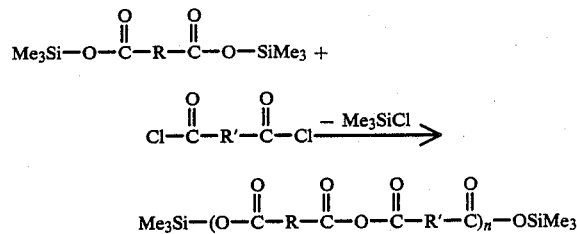

where R and R' are divalent organic radicals which do not interfere with the reaction and may be the same or different, and n is a number representing the degree of polymerization. The value of n may be such that the weight average molecular weight of the polyanhydride is, for example, about 10,000 to 100,000, preferably about 20,000 to 50,000.

R and R' may each be, for example, a divalent alkylene group containing, e.g., about 1 to 10 carbon atoms; a divalent arylene group, e.g., phenylene such as 1,4-phenylene or 1,3-phenylene, or naphthylene such as 2,6-naphthylene; a bis[aryleneoxy]alkane or aryleneoxyalkylene group in which the arylene group, and the alkylene and alkane groups, have the same meanings as those given above for arylene and alkylene respectively; or alkenylene containing, for example, 2 to 10 carbon atoms, e.g., ethenylene. In the foregoing exemplary groups, one or more hydrogen atoms may be replaced with substituents which do not interfere with the polymerization reaction and are inert under the conditions of use of the polyanhydride except for possibly affecting the rate of hydrolytic cleavage.

Bis(trimethylsilyl) esters of the following dicarboxylic acids, for example, may be used in carrying out the process of this invention: α,ω-alkylenedicarboxylic acids containing, for example, 3 to 12 carbon atoms such as sebacic, adipic and glutaric acids; bis(p-carboxylphenoxy)alkanes wherein the alkane group contains, for example, 1 to 10 carbon atoms such as bis(p-carboxyphenoxy)methane, 1,3-bis(p-carboxyphenoxy)propane and 1,6-bis(p-carboxyphenoxy)hexane; carboxyphenoxyalkanoic acids in which the alkanoic acid moiety contains, for example, 2 to 11 carbon atoms, such as p-carboxyphenoxyacetic acid, 6-(p-carboxyphenoxy)hexanoic acid and 3-(p-carboxyphenoxy)propionic acid; arylenedicarboxylic acids in which the arylene group is phenylene or naphthylene such as terephthalic, isophthalic and 2,6-naphthylenebicarboxylic acids, and alkenylenedicarboxylic acids in which the alkenylene group contains 2 to 10 carbon atoms such as fumaric, maleic, itaconic or citraconic acids. The preferred trimethylsilyl esters for use in the process are the esters of the foregoing α,ω-alkylenedicarboxylic acids, particularly sebacic acid, and the esters of the foregoing bis(p-carboxyphenoxy)alkanes, particularly 1,3-bis(p-carboxyphenoxy)propane (CPP).

The dicarboxylic acid chlorides contemplated for use in the preparation of polyanhydrides by means of the process of this invention may be, for example, dichlorides of the same dicarboxylic acids delineated previously as suitable for the diacid moiety of the bis(trimethylsilyl) esters utilized in the process. Some dicarboxylic acid chlorides which may be used are dichlorides of α,ω-alkylenedicarboxylic acids containing, for example, 3 to 12 carbon atoms such as sebacoyl, adipyl and glutaryl chlorides, dichlorides of arylene dicarboxylic acids such as terephthaloyl chloride, isophthaloyl chloride and 2,6-naphthylenedicarboxylic acid chloride, and alkenylenedicarboxylic acid chlorides such as fumaryl chloride or itaconyl chloride. The preferred dicarboxylic acid chlorides are the foregoing α,ω-alkylenedicarboxylic acid chlorides, particularly sebacoyl chloride, and the foregoing phenylenedicarboxylic chlorides, particularly terephthaloyl chloride and isophthaloyl chloride.

In some cases, it may be advantageous to operate the process in the presence of a condensation catalyst for the reaction, e.g., a highly ionized organic or inorganic fluoride. Particularly preferred organic fluorides are tetra(hydrocarbyl)ammonium fluorides wherein the hydrocarbyl groups are alkyl containing, for example, about 1 to 4 carbon atoms, phenyl or benzyl, and especially suitable catalysts are tetrabuty ammonium fluoride and benzyltrimethylammonium fluoride. Particularly preferred inorganic fluorides are alkali metal fluorides such as lithium, sodium or potassium fluoride, or ammonium fluoride. If a catalyst is used, it may be present in an amount, for example, of about 0.0001 to 0.1 wt. %, preferably about 0.001 to 0.02 wt. %, based on the total weight of the bis(trimethylsilyl) ester and dicarboxylic acid chloride.

In carrying out the polymerization, approximately equimolar amounts of the bis(trimethylsilyl) ester and dicarboxylic acid chloride together with catalyst may be mixed under vacuum conditions in an inert atmosphere at an elevated temperature, for example, of about 100° to 300° C., preferably about 160° to 240° C., for a period of time sufficient to effect the desired degree of polymerization, e.g., about 120 to 240 min., preferably about 150 to 210 min., while drawing off chlorotrimethylsilane formed during the reaction. Since many of the bis(trimethylsilyl) ester and dicarboxylic acid chloride monomers which may be utilized in the process are liquids under the conditions of reaction, it is possible in many cases to carry out the polymerization neat, i.e., in the absence of a solvent. However, if it is desired to dissolve one or both of the monomers which, for example, may be solid under the conditions of the reaction, or for any other purpose, e.g., temperature control or to minimize side reactions, a reaction solvent may be used. The amount of reaction solvent may be such that the total of the trimethylsilyl ester and dicarboxylic chloride monomers are present in an amount, for example, of about 40 to 60 wt. % of the total composition. Solvents which can be used are, for example, chlorinated hydrocarbons such as chooroform, methylene chloride, 1,2-dichloroethane and 1,1-dichloroethane.

The reaction mixture is aftertreated, e.g., by cooling, dissolving in an appropriate solvent if no solvent is used for the reaction, filtering to remove insoluble impurities, and treating with an appropriate non-solvent for the polymer to obtain the solid coagulated polymer. The polymer is then removed by filtration and dried under vacuum.

If a slight excess of bis(trimethylsilyl) ester is used in the polymerization, the resulting polymer will have trimethylsilyl end groups, as shown in the foregoing equation, which are capable of reacting with bifunctional compounds containing certain end groups, e.g., carboxyl, hydroxyl, halide, etc., to obtain segmented block copolymers having, for example, soft and hard segments in their backbones. These block copolymers can be tailormade to have widely varying properties which are suitable for many different end uses.

If a slight excess of dicarboxylic acid chloride is used in the polymerization, the resulting polyanhydride will have acid chloride end groups which can be hydrolyzed to carboxylic acid groups or reacted with other compounds to obtain various different end groups which are suitable for different purposes, or end capped by reacting with phenol or other monofunctional hydroxy or amino compounds.

If the bis(trimethylsilyl) ester and dicarboxylic acid chloride are based on the same dicarboxylic acid, the resulting polymer will be a homopolyanhydride. On the other hand, if the two monomers are based on different dicarboxylic acids, the resulting polymer will be a copolyanhydride having regularly alternating segments contributed by the monomers. This results in a polymer which tends to have a more controlled rate of hydrolytic degradation than is the case with copolyanhydrides prepared by melt condensation, containing random rather than regularly alternating segments.

The polymerization process of this invention may be carried out in a batch, continuous, or semicontinuous operation. Whichever the operation, it is generally advantageous to reuse the chlorotrimethylsilane in the process either as is, with or without a base such as diethylamine, or after reaction with ammonia to form hexamethyldisilazane (HMDS).

The bis(trimethylsilyl) esters pf dicarboxylic acids contemplated for use in the process of this invention may be prepared, for example, by reacting the free dicarboxylic acid with a trimethylsilylating agent. Some trimethylsilylating agents which may be used are, for example, hexamethyldisilazane (HMDS), chlorotrimethylsilane, bromotrimethylsilane, iodotrimethylsilane, and N,O-bis(trimethylsilyl)trifluoroacetamide (BSTFA), each alone or with a basic compound, e.g., organic amines such as dimethylamine, triethylamine, pyridine, lithium sulfide or sodium sulfide. In preparing the bis(trimethylsilyl) ester, the free dicarboxylic acid and trimethylsilylating agent may be stirred under reflux in an inert atmosphere for a period sufficient to substantially complete the reaction. The reaction mixture may then be worked up using conventional techniques of filtration, evaporation and distillation to obtain the bis(trimethylsilyl) ester. Other methods known in the art may also be used to prepare the ester.

The dicarboxylic acid chlorides may be prepared from the free dicarboxylic acid using any of various methods known in the art, e.g., reacting the acid with thionyl chloride or oxalyl chloride.

The invention is further illustrated by the following examples.

EXAMPLE 1

This example illustrates the formation of bis(trimethylsilyl) sebacate (BTS) and the use of this compound in preparation of a homopolyanhydride of sebacic acid.

In a 300 ml three-necked flask equipped with a mechanical stirrer, a condenser, and a solids addition funnel were placed 131 ml of hexamethyldisilazane (HMDS) under argon atmosphere. Through the funnel, 20.2 g (0.1 mole) of freshly recrystallized sebacic acid were introduced at once with stirring, and two drops of conc. sulfuric acid were added to the reaction mixture. The funnel was removed from the three-neck flask and the neck was stoppered. The reaction mixture was then refluxed for 3.5 hours during which time most of the solids went into solution. The solution was allowed to cool and evaporated in a rotary evaporator under argon atmosphere to remove excess HMDS. The resulting oily product was vacuum distilled to obtain pure BTS, b.p. 146° C./1.8 mm Hg, yield 20.36 g. The IR (1720 cm$^{-1}$ for carbonyl stretch) and $^1$H NMR spectra were in full for carbonyl stretch) and agreement with the structure of BTS.

Into a 100 ml three-necked flask equipped with a mechanical stirrer and a vacuum distillation set-up were introduced 7.17 g (0.03 mole) of sebacoyl chloride, 10.05 g (0.032 mole) of BTS, and 0.1 g of tetrabutylammonium fluoride as catalyst under argon atmosphere. Vacuum was applied (0.65 mm Hg), and as soon as the bubbling of the reaction mixture ceased completely, the reaction flask was lowered into an oil bath. The oil bath was slowly heated to 100° C., and some volatile products started to condense. The oil bath temperature was slowly increased from 100° C. to about 180° C. in about 3 hours time. During this time all the volatiles had condensed and the reaction mixture turned very viscous. The reaction mixture was then cooled under argon and the syrupy product was dissolved in 50 ml of dry methylene chloride inside an argon glove box. The solution was filtered to remove any insoluble impurities and coagulated with 1 liter of dry petroleum ether, filtered, and dried under vacuum, yield 10.6 g. The product showed carbonyl absortions at 1810 and 1742 cm$^{-1}$ characteristic of a homopolyanhydride of sebacic acid, and also a small peak at 1710 cm$^{-1}$ corresponding to silyl ester end groups. The IR spectrum of the condensate (yield 6 g) was found to be identical with the IR spectrum of an authentic trimethylsilyl chloride.

EXAMPLE 2

This example illustrates the preparation of a regularly alternating copolyanhydride of terephthalic acid (TA) and sebacic acid (SA).

Following the procedure of Example 1, a copolyanhydride of TA and SA was prepared using 3.8 g of BTS (11 mmol), 2.03 g of terephthaloyl chloride (10 mmol), and 0.1 g of tetrabutylammonium fluoride. The white colored product, yield 3.4 g, showed characteristic anhydride carbonyl absorptions at 1790 and 1720 cm$^{-1}$, and a small shoulder at 1700 cm$^{-1}$ indicating the presence of some silyl ester end groups in the IR spectrum. The decomposition onset of the copolyanhydride was found to be 351° C. under nitrogen atmosphere as determined by thermogravimetric analysis. The product was extremely moisture sensitive and underwent hyrolysis quite readily under ambient conditions.

EXAMPLE 3

This example illustrates the preparation of a regularly alternating copolyanhydride of isophthalic acid (IPA) and sebacic acid (SA).

The procedure of Example 1 was followed using 3.8 g of BTS (11 mmol), 2.03 g of isophthaloyl chloride (10 mmol), and 0.1 g of tetrabutylammonium fluoride. The white colored powdery product, yield 3.4 g, showed characteristic anhydride carbonyl absorptions at 1800 and 1740 cm$^{-1}$ in the IR spectrum. The decomposition onset under nitrogen atmosphere was at 248° C. as determined by thermogravimetry. The melting point of the product was at 129° C. as determined by differential scanning calorimetry.

EXAMPLE 4

This example illustrates the preparation of a regularly alternating copolyanhydride of 1,3-bis(p-carboxyphenoxy)propane (CPP) and sebacic acid (SA).

Using the procedure of Example 1, the bis(trimethylsilyl) ester of CPP was prepared by reacting CPP with hexamethyldisilazane (HMDS). The copolyanhydride of CPP and SA was then synthesized using 40.02 g of bis(trimethylsilyl) ester of CPP (87 mmol), 20.5 g of sebacoyl chloride (86 mmol), and 0.2 g of tetrabutylammonium fluoride. The product after usual purification was awhite powdery solid, yield 25.41 g. The IR of the product showed distinctive anhydride carbonyl absorptions at 1800 and 1740 cm$^{-1}$.

The weight average molecular weight of each of the polyanhydrides formed in Examples 1 to 4 is within the range of about 20,000–50,000.

The polyanhydrides of this invention can in many cases be mixed in the form of their melt with an agent such as a drug, herbicide, fungicide or insecticide, and the resultant blend formed into microspheres by slowly pouring the molten blend into silicone oil which had been warmed to the same temperature, as disclosed in the second Leong et al. article cited previously. The polyanhydride in such microspheres acts as a controlled release agent for the active agent blended therewith as a result of its gradual hydrolytic cleavage under ordinary conditions. The polyanhydrides may also in some cases be melt-, dry-, or wet-extruded into sutures subject to controlled dissolution, or, mixed with a treating agent, into films suitable for skin patches which again are subject to a controlled rate of hydrolytic cleavage with accompanying liberation of the treating agent. Finally, some of the polyanhydrides blended with a treating agent may be melt, dry, or wet spun into fibers which can be formed into non-woven articles suitable for wound dressings which, as a result of their hydrolytic degradation, release the treating agent at a controlled rate.

I claim:

1. A process of preparing a polyanhydride comprising condensing a bis(trimethylsilyl) ester of a dicarboxylic acid with a dicarboxylic acid chloride to yield the polyanhydride and chlorotrimethylsilane as a by-product.

2. The process of claim 1 wherein said bis(trimethylsilyl) ester is of an α,ω-alkylenedicarboxylic acid containing 3 to 12 carbon atoms.

3. The process of claim 2 wherein said ester is bis(trimethylsilyl) sebacate.

4. The process of claim 1 wherein said bis(trimethylsilyl) ester is of a bis(p-carboxyphenoxy)alkane wherein said alkane contains 1 to 10 carbon atoms.

5. The process of claim 4 wherein said ester is the bis(trimethylsilyl) ester of 1,3-bis(p-carboxyphenoxy)propane.

6. The process of claim 1 wherein said dicarboxylic acid chloride is an α,ω-alkylenedicarboxylic acid chloride containing 3 to 12 carbon atoms.

7. The process of claim 1 wherein said acid chloride is sebacoyl chloride.

8. The process of claim 1 wherein said dicarboxylic acid chloride is a phenylenedicarboxylic acid chloride.

9. The process of claim 8 wherein said acid chloride is terephthaloyl chloride.

10. The process of claim 8 wherein said acid chloride is isophthaloyl chloride.

11. The process of claim 1 carried out in the presence of a condensation catalyst for the reaction.

12. The process of claim 11 wherein said condensation catalyst is a highly ionized organic or inorganic fluoride.

13. The process of claim 12 wherein said fluoride is tetrabutylammonium fluoride.

14. The process of claim 1 wherein said bis(trimethylsilyl) ester and acid chloride are of the same dicarboxylic acid and said polyanhydride is a homopolyanhydride of said acid.

15. The process of claim 14 wherein said ester and acid chloride are each of sebacic acid and said polyanhydride is a homopolyanhydride of sebacic acid.

16. The process of claim 1 wherein said bis(trimethylsilyl) ester and acid chloride are of different dicarboxylic acids and said polyanhydride is a regularly alternating copolyanhydride of said acids.

17. The process of claim 16 wherein said ester is of sebacic acid, said acid chloride is terephthaloyl chloride, and said copolyanhydride is of sebacic and terephthalic acids.

18. The process of claim 16 wherein said ester is of sebacic acid, said acid chloride is isophthaloyl chloride, and said copolyanhydride is of sebacic and isophthalic acids.

19. The process of claim 16 wherein said ester is of 1,3-bis(p-carboxyphenoxy)propane, said acid chloride is sebacoyl chloride, and said copolyanhydride is of 1,3-bis(p-carboxyphenoxy)propane and sebacic acid.

20. The process of claim 1 carried out by reacting approximately equimolar amounts of said bis(trimethylsilyl) ester and acid chloride in an inert atmosphere under vacuum and at an elevated temperature.

* * * * *